May 15, 1956 E. A. ROBERTS ET AL 2,745,278
APPARATUS FOR MEASURING DENSITY OR PRESSURE
Filed March 24, 1952 3 Sheets-Sheet 1
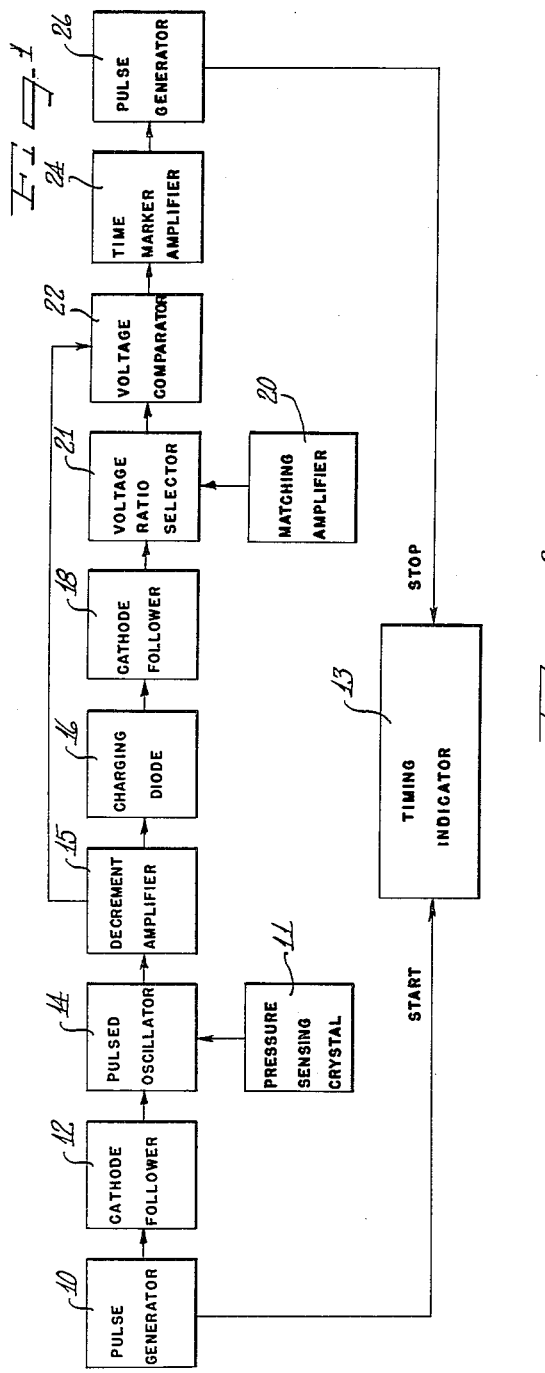
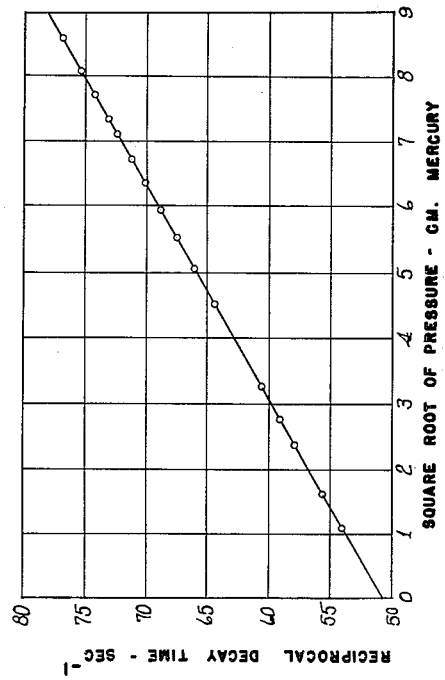
Inventors
Edward A. Roberts
Paul Goldsmith

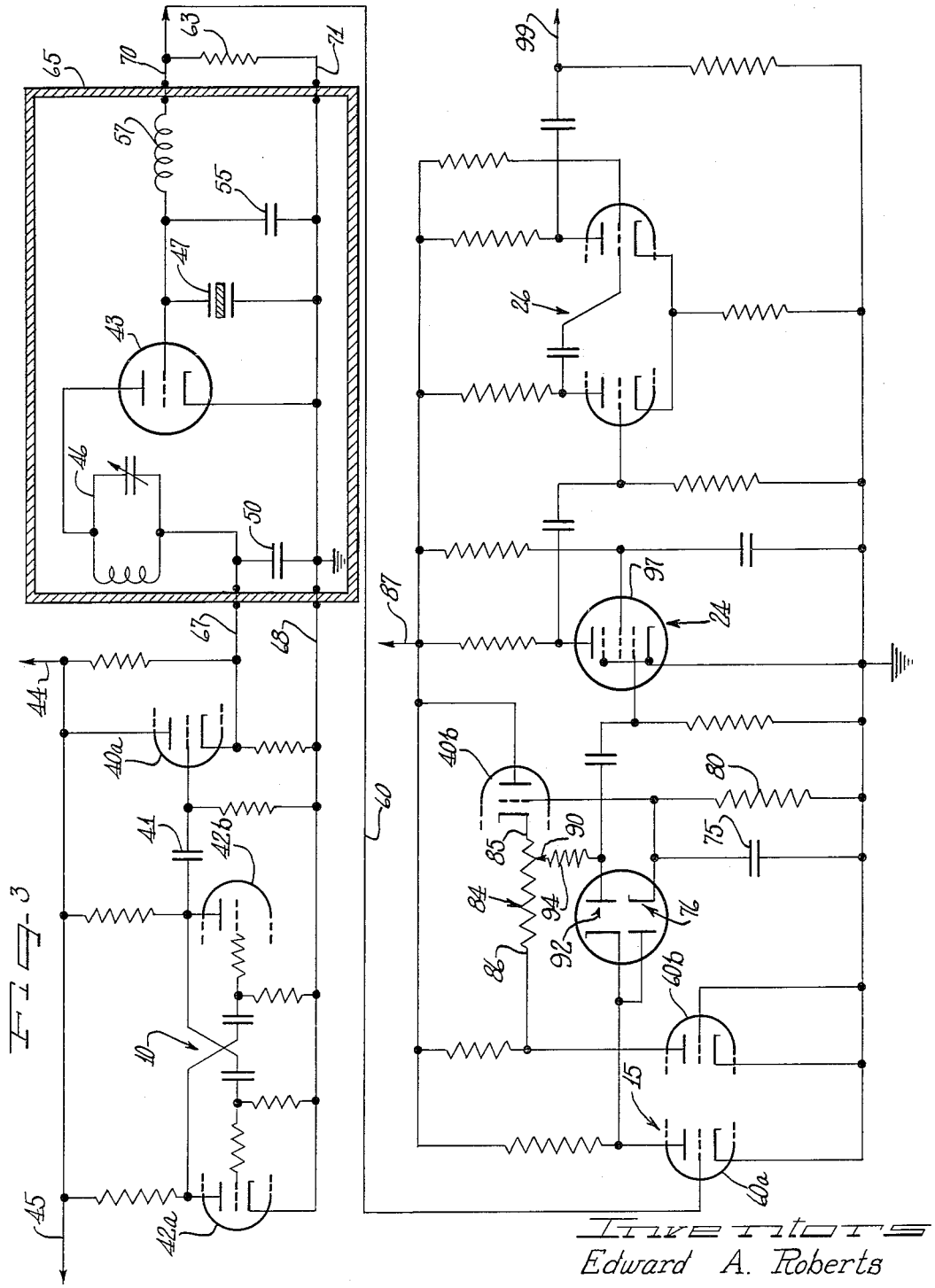

May 15, 1956  E. A. ROBERTS ET AL  2,745,278
APPARATUS FOR MEASURING DENSITY OR PRESSURE
Filed March 24, 1952  3 Sheets-Sheet 3
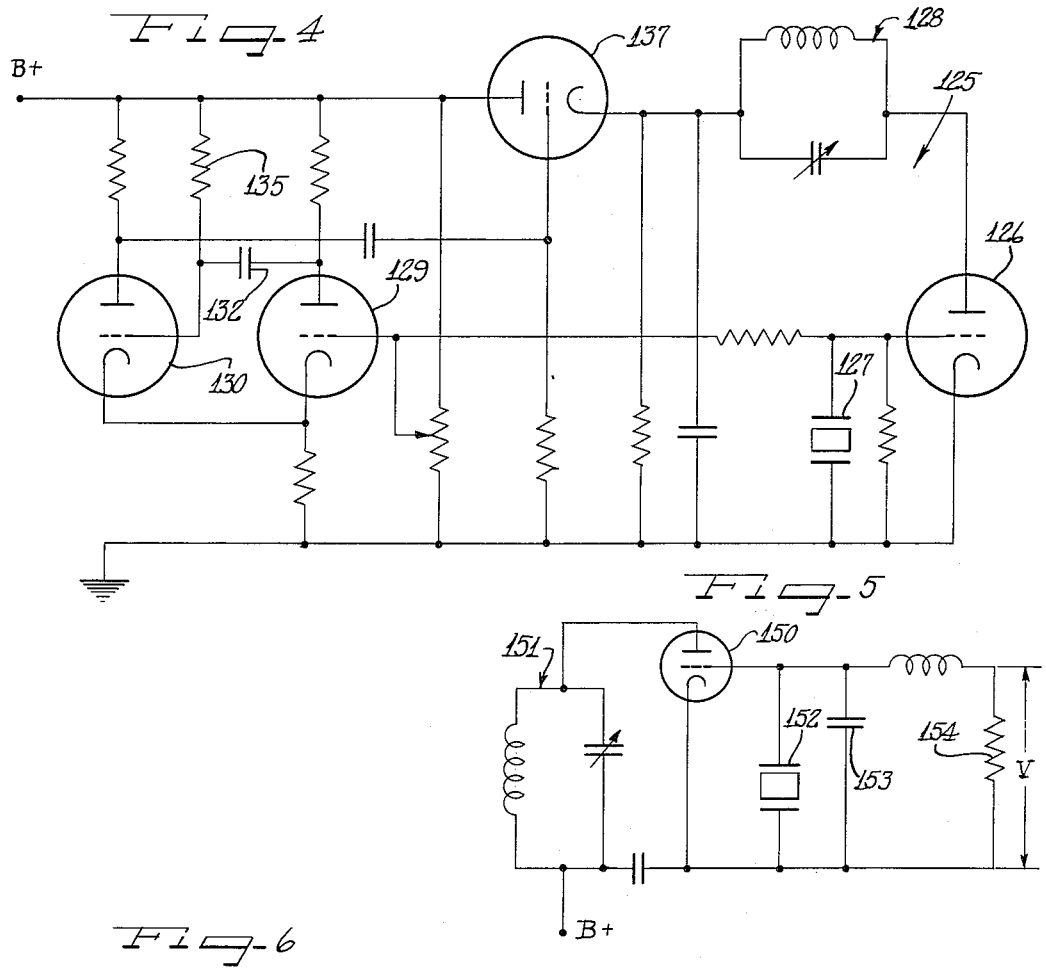
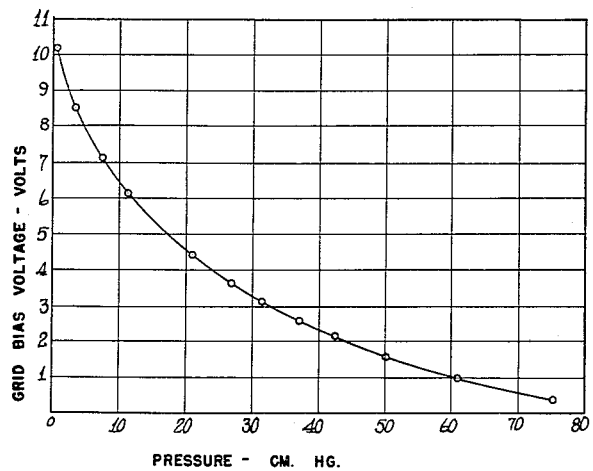
Inventors
Edward A. Roberts
Paul Goldsmith United States Patent Office 2,745,278
Patented May 15, 1956

2,745,278

APPARATUS FOR MEASURING DENSITY OR PRESSURE

Edward A. Roberts and Paul Goldsmith, Chicago, Ill., assignors, by mesne assignments, to the United States of America as represented by the Secretary of the Army Application March 24, 1952, Serial No. 278,152

4 Claims. (Cl. 73—24)

The present invention relates to an instrument for measuring pressure or density of a gaseous medium.

It is generally recognized by research workers that present instruments for determining pressure are not altogether satisfactory. The best known instrument for determining atmospheric pressure balances the air pressure against a liquid column of mercury. This instrument is well suited for barometric measurements but other measuring techniques are generally used in the pressure range below a few millimeters.

The McLeod gage in its various forms is used for pressure measurements in the range from 15,000 to 0.005 microns. The pressure measurement is accomplished by compressing a relatively large quantity of gas into a small volume. For a known ratio of volumes (before and after compression) the pressure can be determined from Boyle's law. The pressure reading obtained with the instrument is proportional to the square root of the height of a column of mercury; for this reason it is difficult to obtain good measuring accuracy over a wide pressure range.

The Pirani and thermocouple gages operate on the principle that the amount of heat transferred from a hot surface by surrounding atmosphere is a function of gas pressure. These instruments must be calibrated relative to the McLeod gage which in turn is calibrated in terms of its physical constants. When the Pirani and thermocouple gages are calibrated with reference to air and are subsequently used with other gases, measurement errors are encountered unless the gases have the same thermal conductivity as air.

The ionization gage is used for pressure measurements in the micron range and below. The sensing element consists of a cathode, grid and plate structure. Electrons emitted from the cathode are attracted toward the grid which is biased positively. Gas molecules are ionized between grid and plate by electrons passing through the grid to produce a current proportional to the number of gas molecules. This type of gage cannot be used above the micron range since higher gas pressures will damage the filament structure of the ionization tube.

Elastic type gases including the aneroid and Bourdon manometers have high sensitivity, but because of hysteresis and creep effects are generally considered inferior to mercury barometers in regard to accuracy.

The hypsometer, an instrument for determining pressure from the boiling point of water, has limited use because of its low sensitivity and complexity of measurement.

It is, therefore, an important object of the present invention to provide a means for measuring pressure or density of a gaseous medium which will be especially accurate and useful at low pressures.

It is another object of the present invention to provide a means for measuring pressure or density of a gaseous medium which need not be separately calibrated for different gaseous media.

It is a further important object of the present invention to provide a means for measuring pressure or density of a gaseous medium susceptible to use both in the micron range and at atmospheric pressure without damage to the instrument.

It is a still further object of the present invention to provide a means for measuring pressure or density of a gaseous medium which can be embodied in a simple, highly accurate instrument.

According to the present invention, a piezoelectric crystal is driven in the region of its resonant frequency and exposed to a gaseous medium whose pressure or density is to be measured. Under such circumstances, it has been found that the oscillating crystal does work against the surrounding atmosphere in the form of acoustic radiation or viscous damping depending on the mode of vibration of the crystal. By measuring the loading effect of the surrounding atmosphere on the crystal, the pressure or density of the atmosphere may be determined.

It is a more specific object of the present invention to provide an instrument for determining pressure having no moving mechanical parts and wherein pressure may be read directly electronically.

It is a further specific object of the instant invention to provide a novel means for measuring atmospheric loading on a piezoelectric crystal.

Other objects and features which we believe to be characteristic of our invention are set forth with particularity in the appended claims. Our invention, itself, however, both as to its organization, manner of construction, and method of operation, together with further advantages and objects thereof, may best be understood by reference to the following description taken in conjunction with the accompanying drawings.

On the drawings:

Figure 1 is a block diagram of an electronic circuit that may be used for measuring pressure by detecting changes in the atmospheric loading of the sensing crystal;

Figure 2 is a graphic representation of the relation between the reciprocal of decay time of a pulsed crystal and the square root of pressure, for a pulsed crystal vibrating in a shear mode;

Figure 3 is a schematic wiring diagram indicating the electronic circuit of a measuring instrument constructed in accordance with the principles and teachings of the present invention and also indicating diagrammatically the probe housing and the electric circuit components contained therein;

Figure 4 is a schematic circuit diagram indicating how the decrement circuit of Figure 3 may be modified for sustained oscillation and be used to measure pressure in accordance with other teachings and principles;

Figure 5 is a schematic circuit diagram indicating a simple type sustaining oscillator circuit which may be utilized to measure pressure in accordance with still other principles and teachings; and Figure 6 is a graphic showing of the relation between grid bias voltage and pressure for the circuit of Figure 5.

As shown on the drawings:

In Figures 1 to 3, there is illustrated a means for determining the pressure of a gaseous medium by measuring the decay time for a given decrement in vibrational amplitude of a sensing crystal which is allowed to vibrate freely in the gaseous medium. In the embodiment illustrated, the sensing crystal is pulsed at regular intervals and its vibrational amplitude is allowed to decay. An electronic circuit is utilized to measure the elapsed time between the maximum amplitude and a selected lesser amplitude of vibration of the crystal. It has been found that the work done by the oscillating crystal against surrounding atmosphere may be in the form of energy dissipated as viscous damping or as acoustic radiation depending upon whether the vibration is in a thickness shear mode or in extension and flexure, respectively.

The ratio of average stored energy of the crystal to energy dissipated per cycle is a measure of the crystal Q, and varies with the air load the crystal works against. In order to obtain a sensitive indication of the pressure or density of the atmosphere surrounding the crystal, it is thus desirable to employ a crystal that has a minimum of loss due to internal friction and damping action contributed by the supports. If it is assumed that the crystal frequency and the density of the surrounding atmosphere are such that the usual microscopic equations of motion of the viscous gas are applicable, it can be shown that changes in crystal Q produced by air loading are inversely proportional to air pressure for crystals vibrating in extension and flexure, and inversely proportional to the square root of pressure for shear mode elements.

By way of example and not by way of limitation, a high frequency quartz crystal vibrating in the thickness shear mode may be utilized as the sensing element. Such a crystal when properly etched and polished and mounted by pressure clamping, may exhibit a Q factor of one-half million or more in vacuum. The fabrication of a type of shear mode crystal, known as a rotated Y cut, has been successfully used for determining pressure by the vibrational amplitude decrement method to be hereinafter described in detail. This crystal was approximately one-half inch square and 10 mils in thickness. While various angles of rotation about the X-axis may be employed, the primary consideration is the selection of an angle of cut and of crystal dimensions that will produce an element free from cross-couplings to undesired modes of oscillation. The technique for obtaining a stable high Q crystal lies in the finishing and mounting process. The crystal element should be lapped and polished to reduce internal damping effects. Edge beveling, surface contouring, and other techniques known to those skilled in the art of crystal fabrication may also be employed to improve crystal characteristics. Mounting of the crystal by pressure clamping yields a higher Q than does surface plating and wire mounting techniques. This method provides firm contact of the crystal at its perimeter, with the central area left free to vibrate. A means of electrical coupling is also provided by the clamping plates which extend over the flat surfaces of the crystal.

Experimental verification of the relationship between crystal Q and pressure for a shear mode crystal is shown in Figure 2, where the square root of pressure is plotted against the reciprocal of decay time of the pulsed crystal. The pressure-time equation therefore has the form $$\frac{1}{t} = m\sqrt{P} + b$$

$m$ and $b$ representing the slope and ordinate axis intercept, respectively. Differentiating this equation and eliminating $t$.

$$\frac{dP}{dt} = \frac{2\sqrt{P}}{m}(b + m\sqrt{P})^2$$

It is seen that the accuracy of measurement is greatest at low pressures.

Referring to Figure 1, a pulse generator 10 pulses the sensing crystal 11 at regular intervals, and the vibrational amplitude of the crystal is allowed to decay in the interim after each pulse. The elapsed time between any two amplitudes, $a_0$ and $a_1$ is given by the equation $$t_1 - t_0 = \frac{2L}{R} \log a_0/a_1$$

where L and R are the inductance and resistance of the equivalent circuit parameters of the crystal. Thus the elapsed time is also proportional to the Q of the crystal.

A timing indicator 13 is illustrated as being used for the measurement of the elapsed time $t_1 - t_0$ between predetermined crystal amplitudes $a_0$ and $a_1$. The pulse generator 10 may deliver a square wave to cathode follower 12 for pulsing the timing indicator 13 to start timing, as well as to the crystal oscillator circuit 14 for pulsing crystal 11. After the square wave of voltage pulse has ended, the crystal decay current may be amplified in the decrement amplifier 15. The initial maximum amplitude of the crystal decay current is maintained by the action of the charging diode 16. This voltage is impressed on the grid of a cathode follower 18, and the output of the cathode closely follows the grid voltage.

A matching amplifier 20 develops a direct plate voltage that equals the plate voltage of the decrement amplifier 15 when the crystal is allowed to decay completely. This matching amplifier plate voltage is applied to the cathode resistor of the cathode follower 18. The cathode resistor acts as the voltage ratio selector 21, and has the initial value of decay voltage established at the cathode end and the final decay voltage at the other end.

The function of the voltage comparator 22, which may be a diode, is to determine the exact time when the crystal amplitude has decayed to $a_1$ to give the predetermined ratio, $a_0/a_1$. When the ratio of the decay voltages at the voltage comparator 22 becomes greater than that selected at the voltage ratio selector 21, the voltage comparator sends a signal to the time marker amplifier 24. The amplifier 24 provides a signal with a steep leading edge to trigger the pulse generator 26 accurately.

The pulse generator 26 may comprise a "single shot" multi-vibrator circuit that sends a pulse to the timing indicator 13 at the time when the crystal amplitude has decayed to the predetermined ratio $a_0/a_1$ selected at the voltage ratio selector 21. The time difference between this pulse from generator 26 and the end of the square wave pulse from generator 10 to the sensing crystal 11 is measured on the timing indicator 13. The indicator 13 may, for example, comprise an electronic counter which is started by generator 10 and stopped by generator 26 in such a manner as to indicate the decay time, $t_1 - t_0$ desired.

Referring now to Figure 3, the square wave output of the pulse generator 10 is fed into the cathode follower tube section 40a through coupling condenser 41. The cathode follower stage provides a low impedance input to the crystal oscillator and isolation for the pulse generator 10. Plate voltage is supplied to plates of tube sections 42a and 42b of the pulse generator 10, cathode follower tube 40 and oscillator tube 43 from conductor 44. The pulse generator output is delivered to the electronic counter or timing indicator 13 by conductor 45. The crystal oscillator stage, consisting of tube 43 and associated components is pulsed with the square wave output of cathode follower tube section 40a. The pulsing voltage is impressed in series with the plate tank 46 and causes oscillation in the grid circuit to build up and decay exponentially at the frequency of the controlling crystal 47. Condenser 50 serves as a radio frequency by-pass to ground for the high frequency oscillation but does not materially affect the wave form of the input square wave.

The crystal 47 may have a high Q and vibrate in the thickness shear mode as previously described, and oscillate at approximately 6 megacycles per second, for example. After the square wave voltage pulse has ended, the crystal decay current flows through the circuit elements in parallel with the active branch of the crystal. These paralleling elements consist of the input impedance of the vacuum tube oscillator tube 43 and all capacities in parallel with the crystal. It can be shown that a decrement corresponding to the true Q of the crystal is achieved only when the resistance paralleling the crystal is either much greater or much less than the reactance of the paralleling capacitor. A 75 $\mu\mu$f condenser, 55, is connected across the crystal 47 to keep this paralleling resistance-reactance ratio high. The importance of this condenser cannot be overemphasized, for without it, much of the sensitivity of the circuit would be lost.

The output of the crystal oscillator circuit is taken directly from the grid of the oscillator tube 43. On this grid is a negative bias voltage and a superimposed alternating component, both of which vary in magnitude directly with the amplitude of the vibrating crystal 47. This output is coupled through a radio frequency choke coil 57 to the decrement amplifier 15. The radio frequency choke coil 57 eliminates the high frequency component while passing the variation of D. C. grid bias of the crystal circuit through conductor 60 to the decrement amplifier tube section 60a. Resistor 63 provides a ground return for both the oscillator and the amplifier grids.

It will be apparent to those skilled in the art that the components of the high frequency crystal oscillator circuit thus far described can be embodied in a housing or probe 65 as indicated in Figure 3 with cables connecting these components of the circuit with the remainder thereof. Thus, only low frequency variations need be transmitted over the relatively long lines of the cable, for example, a 25 cycle square wave over conductors 67 and 68 and the variations in D. C. grid bias of the crystal circuit over conductors 70 and 71. Thus the possibility of interference from external sources is minimized, and the stability of the instrument is enhanced. As indicated, the probe may have the crystal 47, oscillator tube 43, tank 46, condensers 50 and 55 and choke coil 57 carried therewith as a compact unit. The entire probe unit 65 would thus be adapted for insertion into a chamber or the like the pressure in which it was desired to determine.

The crystal decrement is amplified to approximately 100 volts in the triode amplifier 15. The initial amplitude is maintained across the condenser 75 by the action of charging diode 76 and the long time constant of condenser 75 and resistor 80. This voltage is impressed on the grid of a cathode follower tube section 40b and the output at the cathode closely follows the grid voltage.

A matching amplifier tube section 60b, operating at zero grid bias, develops a D. C. plate voltage that equals the plate voltage at tube section 60a when the crystal is allowed to decay completely. The cathode potentiometer 84 of tube section 40b therefore has the initial value of decay voltage established at the cathode end 85 and the final decay voltage value at the other end 86. Plate voltage is supplied to the plates of tube sections 60a and 60b from plate supply conductor 87.

The ratio of peak voltage at the plate of the decrement amplifier tube section 60a to any point on the cathode potentiometer 84 is not changed by variations in supply voltage or by changes in maximum amplitude of the vibrating crystal 47. Potentiometer 84 serves as the amplitude ratio selector 21 and adjustment of the movable tap 90 thereof adjusts the amplitude ratio for which the circuit will measure decay time.

The function of the diode tube section 92 and its associated resistor 94 is to generate a voltage pulse at the exact time when the crystal amplitude has decayed to the predetermined ratio. When the decay voltage at the cathode of this diode tube section 92 reaches the value selected at potentiometer 84, tube section 92 conducts, and since its plate resistance is small in comparison to resistor 94, the steady voltage on the plate decreases exponentially at this time.

The purpose of the time marker amplifier 24 is to provide a signal with a steep leading edge to accurately trigger the pulse generator 26. The rate of change of voltage at the plate of the diode tube section 92, calculated from the time derivative of the decay equation may be about minus 1800 volts per second after one time constant for an assumed initial decay voltage of 100 volts and a decay time of one-fiftieth of a second. The pentode amplifier tube 97 may have a voltage gain of over 100 and, therefore, may produce a wave front with a rise time of approximately two-tenths of a volt per microsecond.

The pulse generator 26 may be a "single shot" multivibrator circuit that produces a positive output pulse, approximately 100 microseconds in duration for each crystal decrement, occurring at the time when the crystal amplitude has decayed to a predetermined ratio selected as potentiometer 84.

The output of the pulse generator 26 is connected to the "stop" terminal on the timing indicator 13 by conductor 99. Since the timing is initiated at the end of each square wave pulse when the square wave of voltage used to pulse the crystal drops to zero, the time difference from the beginning of this signal to the pulse from pulse generator 26 provides an accurate measurement of the Q of the crystal.

In Figure 4 is illustrated a way of modifying the decrement circuit of Figure 3 to make it cycle continuously at a repetition rate primarily determined by the crystal decay rate. The decrement circuit has been provided with a feed-back network to produce continuous oscillation. When the output of the circuit is properly phased, it can be used to pulse the crystal oscillator stage and produce continuous self-sustained oscillations. The frequency of such an oscillator is a function of the crystal Q. The pressure measuring accuracy of the self-sustained circuit will necessarily be poorer than the accuracy obtainable when the circuit is used with a timing device, since in the former case the frequency of oscillation is effected by circuit components and voltages.

Referring to Figure 4, the crystal oscillator 125, consisting of tube 126, piezoelectric crystal 127 and associate components, develops a negative grid bias when voltage is applied to the plate of tube 126 through the tank circuit 128. When this plate voltage is suddenly removed, the voltage applied to the grid of tube 129 increases as the oscillation amplitude of crystal 127 diminishes. As the grid voltage becomes more positive, conduction through tube 129 finally occurs. This causes the plate voltage of tube 130 to suddenly increase (because of multi-vibrator action) to the B plus value and remain there until condenser 132 discharges through resistor 135. At this time the plate voltage of tube 130 suddenly decreases again. The positive pulse of voltage at the plate of tube 130 is used to drive the cathode follower isolating stage 137 which in turn supplies energy to the crystal oscillator circuit 125. After the pulse is ended, the grid voltage to tube 126 again decreases and the cycle repeats.

The repetition frequency of the circuit is a measure of the rate of decay of oscillation amplitude of the crystal, and hence can be used as a measure of atmospheric pressure. The repetition frequencies may be measured in any suitable manner, as by means of an audio frequency meter.

In Figure 5 is indicated a simple circuit which might be used for measuring pressure. This circuit would have the advantage of being very compact and inexpensive, but, of course, would not be so accurate as a circuit operating on the decrement principle.

Figure 6 indicates the relationship between atmospheric pressure and grid bias voltage for an oscillating crystal in a sustained oscillator circuit such as shown in Figure 5. Many other circuit configurations of this type are, of course, possible; the basic requirements of the sustained oscillator being: one, to provide energy to overcome crystal losses so that oscillations will be maintained; and, two, to utilize a sustaining oscillator circuit design with characteristics that do not tend to limit the amplitude of oscillation of the crystal. Other ways of determining crystal amplitude, and hence pressure may be used. Electrical measurements may include the determination of grid currents flowing through the grid resistor, measurements of radio-frequency current or voltage associated with the crystal, or measurement of plate current flow to the oscillator circuit. It is also conceivable that the crystal amplitude may be determined from mechanical or optical measurements.

Referring specifically to the circuit of Figure 5, a tube 150 has a tank circuit 151 in its plate circuit. Sustained oscillation of the circuit is controlled by the crystal 152 having the condenser 153 in parallel therewith. The activity of the crystal is indicated as being measured across the resistor 154 in the grid circuit.

It should be noted that in the decrement circuits of Figures 1 and 4, particularly, the amplitude of oscillation of the crystal is allowed to decay at substantially its normal rate for free vibration in the gaseous medium, so that the decay rate is a measure of the loading effect of the gaseous medium itself. Further, the crystal is allowed to vibrate at substantially its normal amplitude without interference from reflected sound waves or the like.

There is thus provided in accordance with the present invention an instrument for measuring pressure of a gaseous medium, comprising a piezoeletric crystal, a probe housing for carrying said crystal therewith, electric circuit means separate from said probe housing for driving said crystal, conductor means interconnecting said electric circuit driving means with said crystal, electric circuit means carried by said probe housing for energization in response to the activity of said crystal, an indicating circuit separate from said probe housing for actuation by said crystal activity response means, and conductor means interconnecting said crystal activity response means with said indicating circuit.

The terms "pressure" and "density" are related by well known gas laws and, therefore, these terms are used interchangeably in the specification and claims, and there is no intention to limit the claims to one or the other of these quantities.

While we have shown particular embodiments of our invention, it will, of course, be understood that we do not wish to be limited thereto since many modifications both in the circuit arrangement and in the structure disclosed may be made without departing from the spirit and scope of our invention. We, of course, contemplate by the appended claims to cover any such modifications as fall within the true spirit and scope of our invention.

We claim as our invention:

1. Apparatus for measuring the pressure of a gaseous medium, comprising a first pulse generator, an oscillator circuit including a piezoelectric crystal for cyclical actuation by said first pulse generator, means for generating a signal when said piezoelectric crystal amplitude of oscillation has decayed by a predetermined ratio from an initial amplitude produced by a pulse from said pulse generator, a second pulse generator actuated by said signal from said generating means, and a timing indicator for measuring elapsed time between a pulse from said first pulse generator and a pulse from said second pulse generator.

2. Apparatus for measuring the pressure of a gaseous medium, comprising a first pulse generator, an oscillator circuit including a piezoelectric crystal for cyclical actuation by said first pulse generator, means for generating a signal when said piezoelectric crystal amplitude of oscillation has decayed by a predetermined ratio from an initial amplitude produced by a pulse from said pulse generator, a second pulse generator actuated by said signal from said generating means, a timing indicator for measuring elapsed time between a pulse from said first pulse generator and a pulse from said second pulse generator, and a probe housing carrying said oscillator circuit.

3. Apparatus for measuring the density of a fluid comprising a first pulse generator, a mechanically resonant element exposed to said medium intermittently excited into oscillation at its resonant frequency by said first pulse generator, whereby a damped wave is produced, means coupled to said element for generating a signal when the amplitude of said oscillation has decayed by a predetermined amount from an initial amplitude produced by a pulse from said pulse generator, a second pulse generator actuated by said signal, and a timing indicator coupled to said pulse generators for measuring elapsed time between a pulse from said first pulse generator and a pulse from said second pulse generator, thereby to provide an indication of the density of said medium.

4. In combination, a first pulse generator, a resonant element intermittently excited into oscillation at its resonant frequency by said first pulse generator, whereby damped oscillation is produced, means coupled to said element for generating a signal when the amplitude of said oscillation has changed by a predetermined amount from an initial amplitude, a second pulse generator actuated by said signal, and a timing indicator for measuring elapsed time between a pulse from said first pulse generator and a pulse from said second pulse generator.

References Cited in the file of this patent

UNITED STATES PATENTS

| | | |
|---|---|---|
| 2,315,756 | Warner | Apr. 6, 1943 |
| 2,440,886 | Bach | May 4, 1948 |
| 2,536,025 | Blackburn | Jan. 2, 1951 |
| 2,536,111 | Van Dyke | Jan. 2, 1951 |
| 2,571,171 | Van Dyke | Oct. 16, 1951 |
| 2,572,667 | Ruggles | Oct. 23, 1951 |

FOREIGN PATENTS

| | | |
|---|---|---|
| 268,353 | Germany | Dec. 13, 1913 |
| 637,111 | Great Britain | May 10, 1950 |
| 637,112 | Great Britain | May 10, 1950 |

OTHER REFERENCES

Brown et al.: Review of Scientific Instruments, vol. 2, 1931, pp. 180–183.

Institute of Radio Engineers, Proceedings, Van Dyke, vol. 23, No. 4, 1935, pp. 386–392.

Review of Scientific Instruments, vol. 20, No. 5, 1949, p. 364, by Johnson.